US005375915A

United States Patent [19]
Harry et al.

[11] Patent Number: 5,375,915
[45] Date of Patent: Dec. 27, 1994

[54] SEAT STRUCTURE FOR A LAND MOTOR VEHICLE

[75] Inventors: Sylvain B. Harry, Villemoutiers; Jean-Pierre Chabanne, Champvallon, both of France

[73] Assignee: Cesa-Compagnie Europeene de Sieges Pour Automobiles, Lavallois-Perret, France

[21] Appl. No.: 21,962

[22] Filed: Feb. 24, 1993

[30] Foreign Application Priority Data

Feb. 25, 1992 [FR]  France ................. 92 02172

[51] Int. Cl.⁵ ............................................. B60N 2/02
[52] U.S. Cl. .................................. 297/367; 297/354.12
[58] Field of Search ............ 297/367, 366, 354.12, 297/374, 354.13, 216.1

[56] References Cited

U.S. PATENT DOCUMENTS

| | | | |
|---|---|---|---|
| 4,538,856 | 9/1985 | Katsumoto et al. | 297/367 |
| 4,627,656 | 12/1986 | Gokimoto et al. | 296/65 R |
| 4,634,182 | 1/1987 | Tanaka | 297/379 |
| 4,736,986 | 4/1988 | Kato et al. | 297/367 |
| 5,138,744 | 8/1992 | Coggon | 297/367 X |
| 5,154,476 | 10/1992 | Haider et al. | 297/367 |

FOREIGN PATENT DOCUMENTS

| | | |
|---|---|---|
| 121452 | 10/1984 | European Pat. Off. . |
| 128067 | 12/1984 | European Pat. Off. . |
| 3323539 | 1/1985 | Germany ................. 297/367 |

Primary Examiner—Peter R. Brown
Assistant Examiner—Milton Nelson, Jr.
Attorney, Agent, or Firm—Sughrue, Mion, Zinn, Macpeak & Seas

[57] ABSTRACT

The seat structure comprises a latching device (60) which is partly carried by one of the brackets (12,22) and partly by the other of these brackets (12,22) for latching in two opposed directions the backrest (20) to the seat (10) when the backrest occupies at least one of two particular positions, namely a "normal" position and a "relaxing" position so as to absorb and/or transmit important forces to which the seat structure is subjected in the event of a shock having a large longitudinal component. The latching device is brought into action by a hand control (50) of a locking mechanism. The seat structure is particularly applicable to so-called "one volume" or "monospace" vehicles.

13 Claims, 4 Drawing Sheets

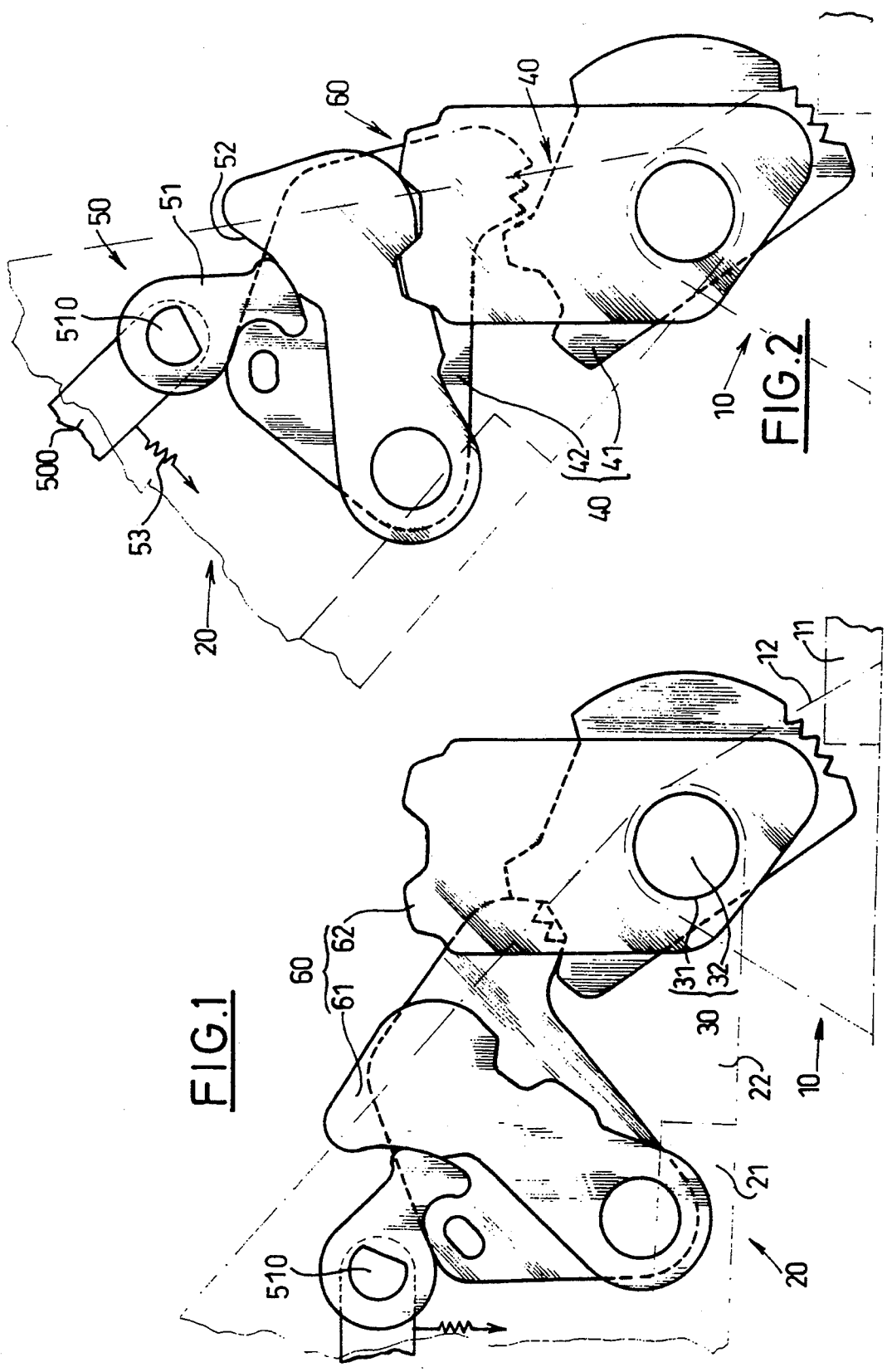

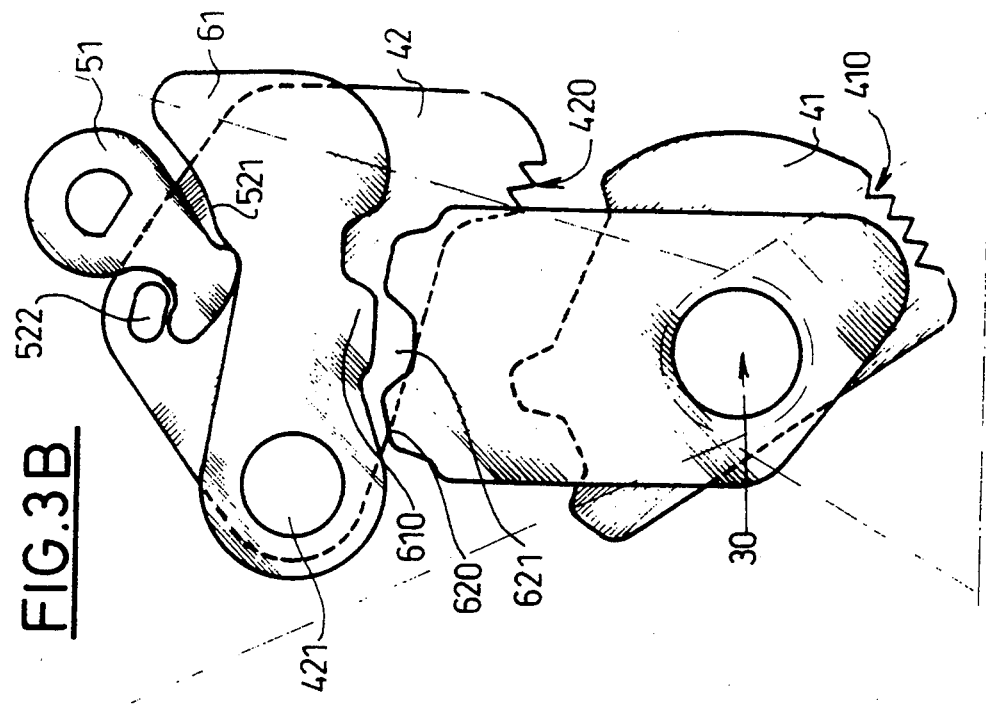
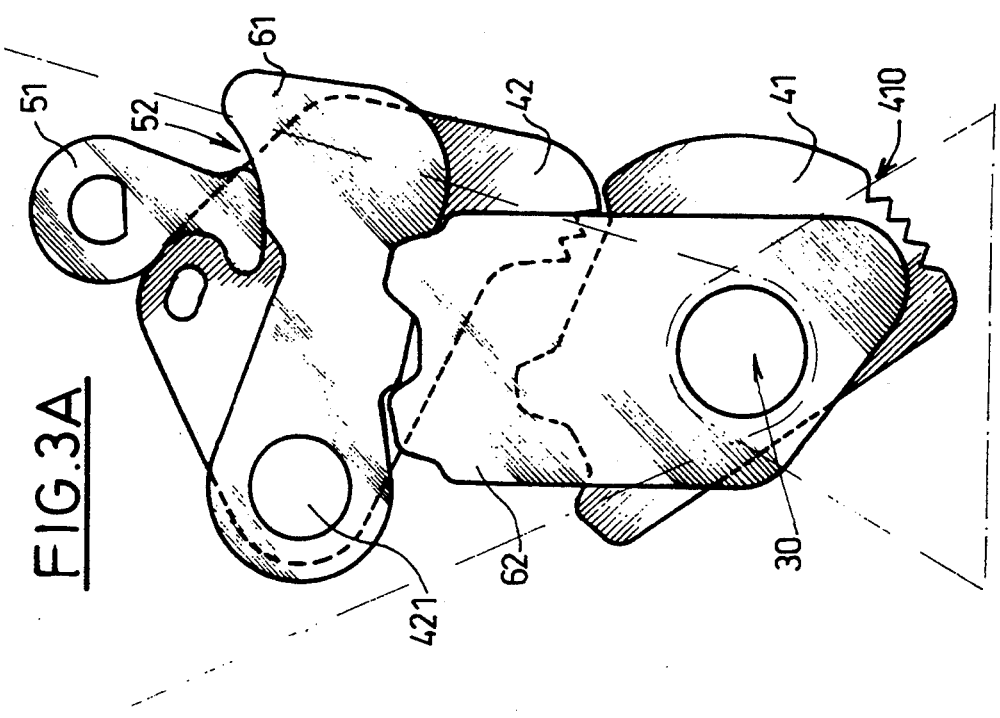

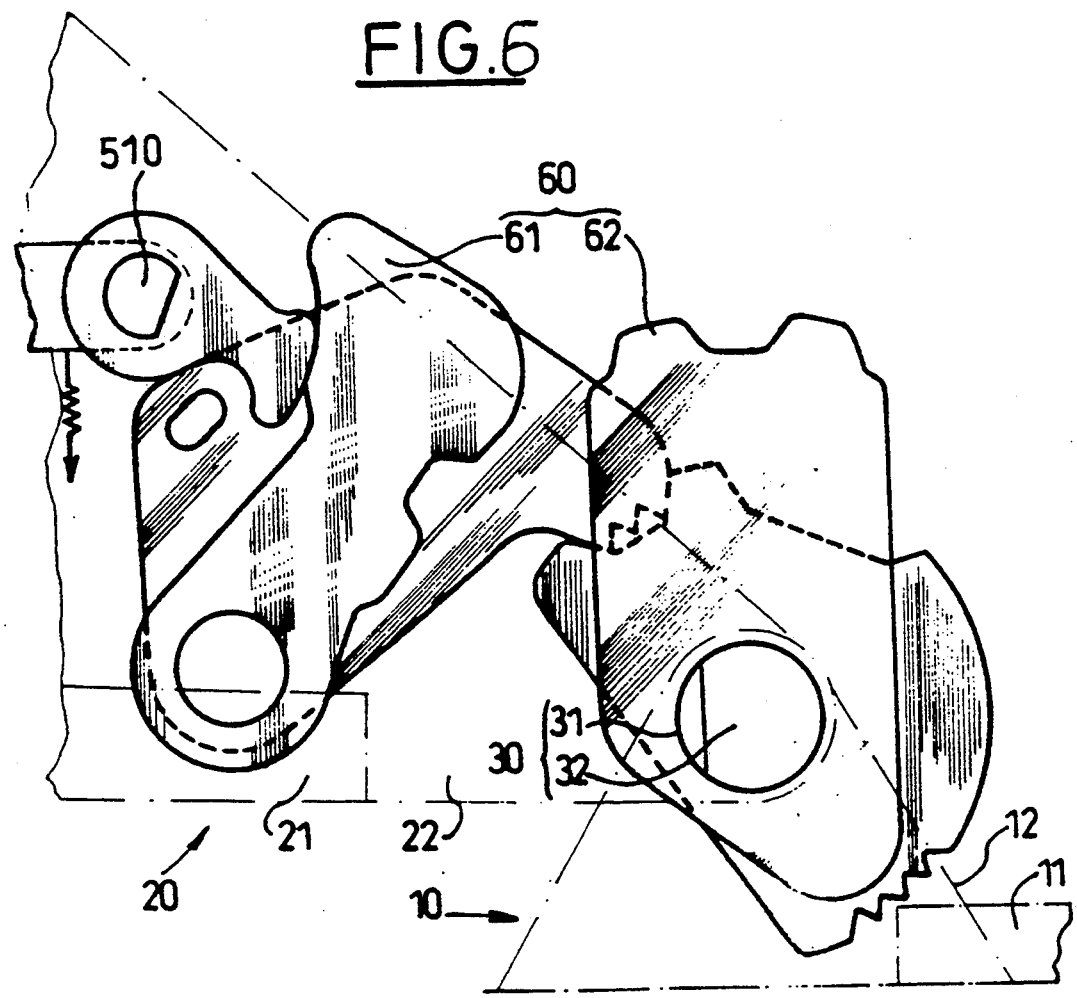

SEAT STRUCTURE FOR A LAND MOTOR VEHICLE

BACKGROUND OF THE INVENTION

The present invention relates to seat structures, and more particularly, seat structures of land motor vehicles capable of occupying a plurality of predetermined positions of adjustment.

The contemporary tendency of motor vehicle manufacturers is to design so-called "monospace" or "one-volume" vehicles which are akin to both the sedan called a station wagon and the utility vehicle called a van. In view of the intended universitality of utilization of these vehicles, they must be equipped with seat structures capable of taking up preferably predetermined, multiple and varied positions, i.e. a certain number of discrete positions, each of which is well defined. Seat structures of this type must for example be capable of being completely folded into a bed, an easy-chair or reclining chair, a normal driving seat, or partly folded into a small table or shelf; they also must be capable of being partly folded away or completely folded up in a compact manner to a relatively small size for the purpose of stowing away in the vehicle or removing them from the latter.

Such seat structures must also satisfy safety standards drawn up by professional bodies or public authorities so that the occupant of a seat structure is effectively retained thereon by a safety belt in event of violent shocks having in particular a large longitudinal component with respect to the vehicle.

This last-mentioned requirement becomes particularly difficult to satisfy when, as is becoming more and more common, such a safety belt is no longer directly anchored at two or three points of the frame or body of the vehicle, the safety belt being as it were independent of the seat structure, but is on the contrary integral with the seat structure and as it were carried by the latter, the different anchoring points for the safety belt being established directly on the seat structure itself. In such a situation in which the belt is carried by the seat structure, in the event of violent shocks, the forces to be absorbed and/or transmitted are consequently located essentially, on one hand, in the region of the axis of relative inclination between the backrest and the seat of the seat structure, and, on the other hand, in the region of the base mounting usually securing the seat of the seat structure to the floor of the vehicle.

It will be understood how difficult it is to satisfy all these prescriptions, which are often contradictory, especially when it is considered that such a seat structure must be mass-produced at the lowest possible cost.

A solution has been proposed in document EP 0 121 452 for a seat structure articulated at a single position which is adjusted in a substantially continuous manner for the case where such a seat structure is not equipped with a safety belt carried by the seat. The seat structure according to this document mainly comprises a seat equipped with a frame provided with a bracket, a backrest equipped with a frame with a bracket, an articulation which interconnects said brackets, permits the backrest to swing relative to the seat so as to change its inclination, and is constituted by a bearing and a pin engaged in the latter, a locking mechanism which normally immobilizes the backrest relative to the seat in the position in which it has been placed, permits changing the position at will, and is constituted by a toothed sector fixed to one of said brackets and centered on the pin of the articulation, a toothed block adapted to cooperate with said toothed sector and movably mounted on the other of said brackets by means of at least one guide carried by the latter so as to be movable thereon, and a hand control which comprises a movable cam cooperating with a counter-cam fixed to the toothed block and an elastically yieldable biasing device which normally maintains the cam and counter-cam, and the toothed block and toothed sector applied against one another so as to establish and maintain a contact, in particular between the toothed block and the guide.

This solution is satisfactory, since it permits the construction of a seat structure without any operational play, whether this results from manufacturing tolerances or wear in the course of time. However, such a solution is unsuitable as such in the situation where a seat structure is equipped with a safety belt carried by the seat structure and must be capable of absorbing and/or transmitting forces to which the seat structure is subjected in the event of violent shocks having a large longitudinal component which comes from both the front and or the rear, and when such a seat structure is of a type having multiple discrete positions and occupies its "normal" driving position or a reclining or relaxing position close to the driving position.

Indeed, in the last-mentioned situation, an occupied seat structure must be capable of supporting and resisting without damage accelerations and decelerations exceeding ten g, and in order to achieve this with the solution of this document it is necessary to give the toothed block and the toothed sector great thickness and to employ a tooth having a large modulus. These considerations result in heavy and space-consuming structures with a relatively coarse adjustment, which features are very poorly suited to a practical utilization in mass production.

SUMMARY OF THE INVENTION

An object of the invention is to overcome most of these difficulties.

The invention provides an articulated seat structure which has predetermined multiple positions of adjustment including at least one normal driving position and a relaxing position which is close to the driving position, is adapted to be equipped with a safety belt carried by the seat structure, and which comprises, among other elements, a seat frame with a bracket, a backrest frame with a bracket, an articulation enabling the backrest to swing relative to the seat for changing the inclination thereof and comprising a bearing and a pin engaged in the bearing, a locking mechanism normally immobilizing the backrest relative to the seat in the position in which it has been placed and enabling the position of the backrest to be changed at will, and comprising a toothed sector fixed to one of said brackets and centered on the pin of the articulation, a toothed block adapted to cooperate with the toothed sector and movably mounted on the other of said brackets by means of at least one guide carried by said other bracket so as to be movable thereon, a hand control including a movable cam cooperative with a counter-cam fixed to the toothed block, and an elastically yieldable biasing device which normally maintains said cam and counter-cam and said toothed block and toothed sector applied against one another so as to establish a contact in particular between the toothed block and the guide, characterized in that the seat structure comprises a latching device which is partly carried by one of said brackets and partly carried by the other of said brackets for the purpose of latching in two opposed directions the backrest to the seat when the backrest occupies at least one of said two positions comprising the normal position and the relaxing position so that it is possible to absorb and/or transmit large forces to which the seat structure is subjected in the event of a shock having a large longitudinal component, said latching deving being brought into action by the hand control of the locking mechanism.

Further features of the invention will be apparent from the following description and claims and from the accompanying drawings which are given solely by way of example and in which:

BRIEF DESCRIPTION OF THE DRAWING

FIG. 1 is a partial elevational view of a detail of an embodiment of the invention in the "bed" position;

FIG. 2 is a view similar to FIG. 1 in the "relaxing" position;

FIGS. 3A and 3B are similar views in the "normal" position respectively latched or active and unlatched or inactive;

FIG. 6 is a similar view to FIG. 1 and includes a non-circular pin. and

FIG. 6 showing the non-circular pin has been added.

DESCRIPTION OF A PREFERRED EMBODIMENT

Figure 5:
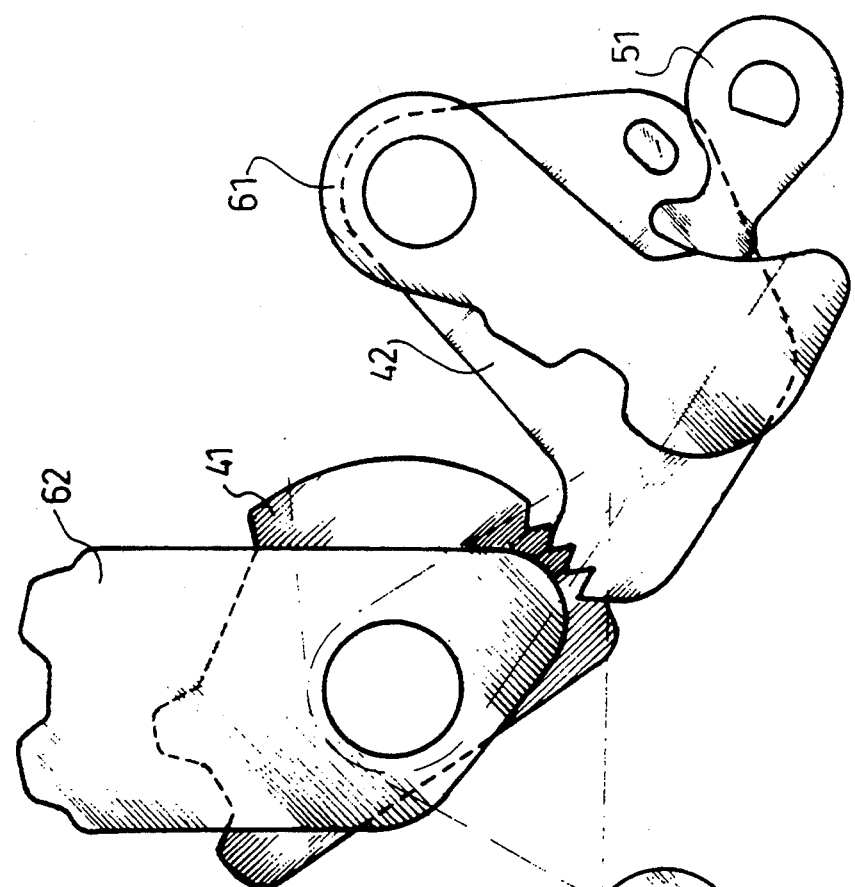
FIG. 5 is a similar view in the "compact" position.

As the articulated seat structures, in particular those intended to equip land motor vehicles having predetermined multiple positions of adjustment modified at will are well known in the art, only that part which directly or indirectly concerns the invention will be described. For the rest, one skilled in the art of the concerned technical field will draw from current conventional solutions for solving particular problems with which he may be confronted.

Hereinafter, the same reference numeral will always be used for identifying a similar element irrespective of the embodiment or the alternative arrangement.

For the convenience of the description, there will be described in succession each of the parts of an embodiment of an articulated seat structure according to the invention before describing the assembly, the fabrication and the operation if need be.

The following essentially concerns the region of the seat structure in which there are located the means for modifying, at will, the relative inclination or position of its backrest and its seat, and for immobilizing the seat structure in the chosen position.

A seat structure according to the invention comprises, among other elements, mainly a seat 10, a backrest 20, an articulation 30 permitting the modification of the relative inclination or position between said seat and backrest, a locking mechanism 40 normally immobilizing the backrest relative to the seat in the position in which it was placed and allowing this position to be changed at will, a hand control 50 for bringing into action the locking mechanism, and a latching device 60 for latching in two opposed directions the backrest relative to the seat when the backrest occupies in particular either one of two discrete positions chosen from among the various predetermined positions it is capable of taking up, the latching device being brought into action by the hand control in question.

As already mentioned, a seat structure according to the invention is capable of taking up a well-defined number of predetermined discrete positions, for example five as mentioned before, without it being possible, in principle, to be able to make small modifications or fine adjustments on either side of each of said predetermined positions. It will also be recalled that such a seat structure is intended to incorporate a safety belt carried by the seat structure and that it must therefore be capable of absorbing and/or transmitting large forces to which it is subjected in the event of relatively violent shocks having a large longitudinal component, especially when it occupies at least two specific positions which correspond, for example, to the normal position that the seat structure occupies when the vehicle is in motion, i.e. a driving or road position, and also a reclining or "relaxing" position close to the driving position when the backrest is slightly more inclined toward the rear of the vehicle relative to the seat. Indeed, it is essentially in respect of these two more specific positions that a seat structure according to the invention must offer a resistance in the event of violent shocks since, in respect of the other positions, either the seat structure cannot be occupied or the seat structure is in the "bed" position in which case it is clear that, even if the occupant wears his safety belt, it is highly improbable that the vehicle would be normally travelling on the road.

The seat 10 comprises a frame 11 with a bracket 12. In the conventional manner, the frame is provided for fixing a cushion, and the bracket is provided for joining the seat to the backrest.

This frame and bracket which may or may not be in one piece, are for example constructed from tubes, shapes or sheet metal members shaped and worked in accordance with traditional techniques.

The backrest 20 comprises a frame 21 with a bracket 22. That which has been explained in respect of the frame and the bracket of the seat applies to the frame and the bracket of the backrest. This is why these frames and brackets have been illustrated only very diagrammatically.

The articulation 30 which enables the backrest to swing to an inclined position relative to the seat for changing its orientation, connects the brackets 12 and 22. This articulation comprises a bearing 31 and a pin 32 engaged in the latter. For example, the pin 32 is fixed to the bracket 12 of the seat 10 which may be considered to be fixed, while the bearing 31 is fixed to the bracket 22 of the backrest 20 which may be considered to be movable. It is clear that the opposite arrangement may also be adopted. If desired, either the pin or the bearing is not circular and has for example an oval shape or is provided with a flat portion so that, when it is subjected to a force in a direction perpendicular to the direction of the pin, any existing or pre-existing play is taken up.

The locking mechanism 40 is adapted to normally immobilize the backrest relative to the seat in the position in which it was placed and to allow a change in this position at will. This locking mechanism 40 comprises a toothed sector 41 with a set of teeth 410 fixed to one of the brackets 12 and 22, for example the bracket 12 of the seat 10, as illustrated. This toothed sector is centered on the pin 32 of the articulation 30. This locking mechanism further comprises a toothed block or element 42 with a set of teeth 420 adapted to cooperate with those of the toothed sector 41. This toothed block 42 is movably mounted on the other of the brackets 12, 22 and consequently in this embodiment on the bracket 22 of the backrest. This toothed block is mounted on the bracket which receives it by means of at least one guide 421, such as a journal or slides carried by the bracket in such manner as to be movable thereon, for example in translation and/or in rotation. If desired, the movable mounting of the toothed block on the bracket is arranged with clearance so that it is in particular possible to avoid manufacturing tolerances and/or assembly tolerances which are too strict. This toothed sector and this toothed block are for example made from sheet metal produced by a fine press forming or blanking. As can be seen, one of the sets of teeth 410, 420, for example the set of teeth 410 of the toothed sector 41, is not continuous and the size and/or the pitch of the teeth is not uniform for reasons which will be explained hereinafter.

The hand control 50 permits acting in particular on the locking mechanism 40 to permit changing, at will, the orientation of the backrest relative to the seat and placing it in any one of predetermined various discrete positions. As will be noted hereinafter, this control also permits acting on the latching device 60. The control 50 comprises a movable cam 51, a counter-cam 52 adapted to cooperate with the cam 51, and an elastically yieldable biasing device 53. The cam 51 is mounted on one of the brackets 12, 22, for example on the bracket 22, of the backrest 20 so as to move with the latter. As can be seen, this cam 51, which has for example approximately the shape of a boot, is mounted on a pin, rivet, stud or the like 510 so as to be capable of being swung in a plane parallel to the plane of the sheet of the drawing, i.e. in a direction parallel to the pivot pin which is perpendicular to this plane. The rotation of this cam is controlled, at will, by the occupant of the seat structure with the aid of a lever 500 or the like, within reach of the hand, for example on the right or left side of the seat structure, with if need be a linkage or the like associated with the lever so that it is possible to actuate it from behind the backrest 20 if desired. The counter-cam 52 is fixed to the toothed block 42. As can be seen, the counter-cam 52 comprises an immobilization region 521 and a neutralization region 522, reference to which will be made hereinafter. The control 50 further comprises an elastically yieldable biasing device 53, for example a coil spring or the like, secured on one hand, for example to the lever 500 and, on the other hand, to the frame 21 or bracket 22 of the backrest 20. The cam and counter-cam are preferably made from sheet metal by the traditional techniques of machining or pressing or fine blanking for example, or even by moulding or powder sintering.

The latching device 60 comprises a movable latch associated with the toothed block 42, and a notched plate 62 associated with the toothed sector 41. As can be seen, the toothed plate 62 has a portion 620 in the form of an arc of a circle centered on the pin 32 of the articulation with an index 621 for at least one of the two normal and relaxing specific positions. According to the illustrated embodiment, the indices 621 are one or more projecting portions which are adapted to cooperate with at least one indentation 610 of the latch 61. In an alternative arrangement (not illustrated), these indices are one or more cavities and are adapted to cooperate with at least one nose portion of the latch acting as an indexing means. It will be clear that there may be employed, if desired, as many indices as there are discrete positions, one index per position.

All the components described hereinbefore are assembled and mounted as clearly shown in the various Figures of the drawing. It will therefore be understood that the elastically yieldable biasing is such that it normally maintains the cam and counter-cam, the toothed block and toothed sector, and, as the case may be, the bearing and the pin applied against one another so as to establish and maintain a contact without play therebetween. Indeed, this elastically yieldable biasing applies, if desired, first of all the toothed block against one of its guides or slides by the judicious choice of the points of application of the forces and by the location of the reaction regions and then, under the effect of the thrust exerted by the toothed block against the toothed sector, applies the bearing against the pin; in this way any possible play is taken up as explained in the aforementioned document. It is however clear that the toothed block and its guide and/or bearing and its pin may also be assembled and mounted without any marked play.

As can be seen in the illustrated embodiment, the counter-cam 52 is carried partly by the toothed block 42 and partly by the latch 61. As can be seen, the immobilization region 521 of the counter-cam 52 is used to maintain in contact the toothed block 42 and the toothed sector 41, on one hand, and the latch 61 and the notched plate 62, on the other hand. The neutralization region 522 of the counter-cam 52 serves to rapidly remove this contact and allow a change in the position. For this purpose, there is employed the opposite face of the cam 51 which acts on the neutralization region, for example a stud of the counter-cam. As can be seen, the immobilization region 521 is carried by the latch 61 and the neutralization region 522 is carried by the toothed block 42.

As can be seen, if need be, the toothed block 42 and the latch 61 are made in a single piece or by means of distinct members placed one against the other and immobilized for example by welding, riveting, screwing, adhesion, . . . . The same is true of the toothed sector 41 and the notched plate 62 which are carried by the same bracket and are fixed to the latter.

It should be noted that the toothed block and the latch are carried by the same bracket and are so mounted as to be simultaneously movable together by means of a single control and that they are both subjected to the action of a single elastically yieldable biasing device.

Reference will now be made more particularly to FIGS. 3A and 3B which show the embodiment of the invention in side elevation, the rear of the seat structure being located on the left side of the Figures and the front on the right side of the latter, in the latched state and in the unlatched state, respectively, in the normal or road position.

It will be assumed that the seat structure is initially in the normal position and latched in this position (FIG. 3A). It can be immediately seen from the latch and the notched plate that, whatever force is exerted and in particular its direction, the latching device irreversibly latches in the two opposite directions the backrest to the seat in a substantially indeflectable manner. The choice of the dimensions and the materials adopted in particular for these elements permits absorbing and/or transmitting the large forces to which the seat structure is subjected in the event of violent shocks having a large longitudinal component.

When the user of the seat structure desires to modify the position, he acts on the single control and in particular on its lever in opposition to the action of the elastically yieldable biasing device so as to place the locking mechanism and the latching device in the position they have in FIG. 3B. It will be observed that, by the judicious choice of the location and of the profile of the cam and counter-cam, the rotation of the cam results at the end of its travel in a very rapid disengagement of the toothed block from the toothed sector and, simultaneously, of the latch from the notched plate. In this way it is ensured that the user does not attempt to modify the position of the backrest relative to the seat before the elements which were initially mutually engaged in one another and cooperated, are completely separated and disengaged from one another. If the user desires for example to place the seat structure in the relaxing position as illustrated in FIG. 2, it is sufficient for him to give to the backrest an approximate inclination and to release the control so that the locking mechanism and the latching device are automatically and simultaneously replaced in the position shown in FIG. 2. In this situation, it is still the latching device which ensures the immobilization in the two opposite directions of the backrest relative to the seat.

Figure 4:
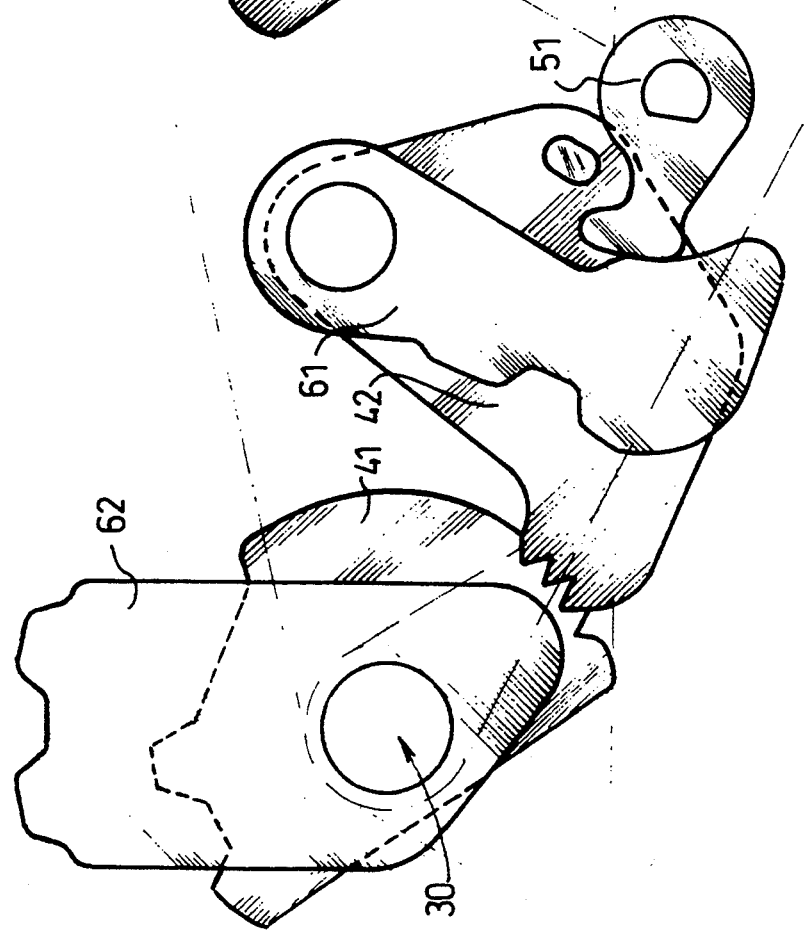
FIG. 4 is a similar view in the "table" position.

If the user desires to give another particular position among the various possible discrete positions, as shown for example in FIGS. 1, 4 and 5, it is sufficient to operate as before. It can be seen that the retaining of the backrest relative to the seat in the position in which it was placed, is only ensured by the toothed block and the toothed sector without the latch and notched plate being operative.

To facilitate a relative pre-orientation between the backrest and the seat to make the changes in inclination more convenient, there are used for example spring-biased pin systems, or mechanical escape systems, or profiles which permit a precise subsequent indexing under the sole action of the elastically yieldable biasing device. This may for example be easily achieved by giving the set of teeth 410 of the tooth sector 41 a particular configuration, as illustrated. It can be seen that the set of teeth 410 has solutions of continuity in the form of an outwardly divergent notch which acts as it were in the way of a keeper for a bolt the function of which is ensured by the toothed block which is in the shape of an outwardly convergent wedge.

The whole interest of the invention will therefore be understood which as it were employs two specialized distinct modules which cooperate with each other, one of which operates only when there is no marked risk of the occurrence of a large abnormal stress, whereas the other operates essentially when there are risks of the occurrence of particularly large stresses. This double function of the toothed block associated with the use of a toothed sector and a coupled notched plate permits marked reductions in size in both the transverse and longitudinal directions bearing in mind the exeptional extent of the movements required in the operation of the considered type of seat structure and, moreover, permits savings in material and therefore a large reduction in weight while satisfying the safety standards required of seat structures which carry the safety belt.

The advantages afforded by the improved seat structure according to the invention are brought out by the foregoing description and the accompanying drawing.

What is claimed is:

1. Seat structure comprising a seat and a backrest articulated together, said seat structure having predetermined multiple positions of adjustment comprising a normal driving position and a relaxing position which is close to the normal position, and comprising a seat frame with a bracket, a backrest frame with a bracket, an articulation interconnecting said brackets and allowing said backrest to swing relative to said seat for changing the inclination of said backrest and comprising a bearing and a pin, having a fixed direction and engaged in the bearing, a locking mechanism normally capable of irreversibly immobilizing said backrest relative to said seat in the position in which said backrest was placed and allowing a change in said position at will and comprising a toothed sector fixed to a first of said brackets and centered on said articulation pin, a toothed block cooperative with said toothed sector, at least one guide carried by a second of said brackets for movably mounting said toothed block on said second bracket, a hand control including a movable cam, a counter-cam fixed relative to the toothed block and cooperative with said movable cam, an elastically yieldable biasing device for normally maintaining in particular said cam and counter-cam, and said toothed block and toothed sector applied against one another so as to establish contact between said toothed block and said guide, said seat structure further comprising a latching device which is carried partly by said first bracket and partly by said second bracket for irreversibly latching said backrest against movement in two opposite directions on said seat when said backrest occupies at least one of said positions comprising said normal position and said relaxing position so that it is possible to absorb or transmit large forces to which said seat structure is subjected in the event of a shock having a large longitudinal component, said latching device being brought into action by said hand control which alone acts in opposition to the action of said elastically yieldable biasing device simultaneously on said locking mechanism and said latching device, only one of said locking mechanism and said latching device operating at a time for retaining said seat structure in that one of said positions of adjustment in which it was placed.

2. Seat structure according to claim 1, wherein said latching device comprises a movable latch rigidly associated with said toothed block and a notched plate rigidly associated with said toothed sector.

3. Seat structure according to claim 2, wherein said notched plate has a portion in a shape of an arc of a circle centered on said pin of said articulation with an index for at least each of said two positions comprising said normal position and said relaxing position.

4. Seat structure according to claim 3, wherein said indices are projecting lugs and are cooperative with at least one indentation of said latch.

5. Seat structure according to claim 2, wherein said counter-cam is carried partly by said toothed block and partly by said latch.

6. Seat structure according to claim 5, wherein said counter-cam comprises an immobilization region for maintaining in contact, on one hand, said toothed block and said toothed sector, and, on the other hand, said latch and said notched plate, and a neutralization region for rapidly eliminating said contact and allowing a change in position.

7. Seat structure according to claim 6, wherein said immobilization region is carried by said latch and said neutralization region is carried by said toothed block.

8. Seat structure according to claim 1, wherein said elastically yieldable biasing device acts on said cam.

9. Seat structure according to claim 8, wherein said counter-cam comprises an immobilization region for maintaining in contact, on one hand, said toothed block and said toothed sector, and, on the other hand, said latch and said notched plate, and a neutralization region for rapidly eliminating said contact and allowing a change in position.

10. Seat structure according to claim 1, wherein one of the members consisting of said bearing and said pin of said articulation is not circular.

11. Seat structure according to claim 10, wherein said elastically yieldable biasing device acts in such manner as to establish and maintain contact without play between said bearing and said pin and between said toothed block and said guide.

12. Seat structure according to claim 1, wherein said toothed block movably mounted on said second bracket by means of said at least one guide is movable thereon with play.

13. Seat structure according to claim 12, wherein said elastically yieldable biasing device acts in such manner as to establish and maintain contact without play between said bearing and said pin and between said toothed block and said guide.

* * * * *